United States Patent Office

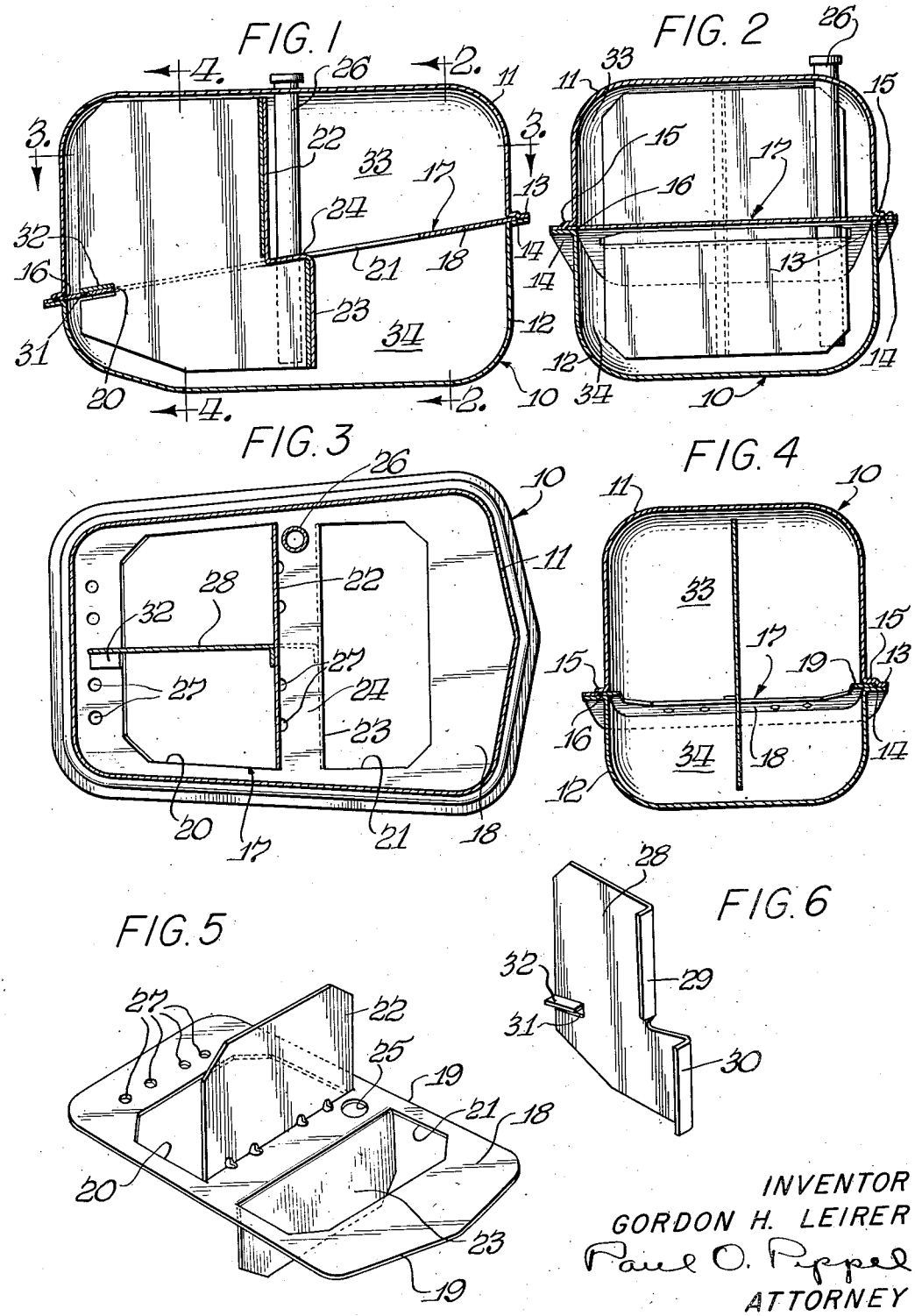

2,806,622
Patented Sept. 17, 1957

2,806,622

FUEL TANK AND BAFFLE ASSEMBLY

Gordon H. Leirer, Chicago, Ill., assignor to International Harvester Company, a corporation of New Jersey Application October 7, 1955, Serial No. 539,150

6 Claims. (Cl. 220—5)

This invention relates to liquid containers such as fuel tanks.

It is a prime object of this invention to provide an improved fuel tank having a simplified and effective baffle assembly contained therein.

Another object is to provide an improved liquid container having a baffle assembly comprising a minimum number of parts supported within said container.

Still another object of the invention is to provide an improved baffle assembly and fuel tank wherein the parts may be readily assembled and secured together by welding means.

These and other objects will become more readily apparent from a reading of the specification when examined in connection with the accompanying sheet of drawing.

In the drawing:

Figure 1 is a cross-sectional view, showing certain portions in side elevation, of a fuel tank;

Figure 2 is a cross-sectional view taken substantially along the line 2—2 of Figure 1;

Figure 3 is a view in cross section taken substantially along the line 3—3 of Figure 1;

Figure 4 is a cross-sectional view of another portion of a fuel tank and baffle assembly taken substantially along the line 4—4 of Figure 1;

Figure 5 is a perspective view showing in detail a portion of a baffle assembly; and Figure 6 is a perspective view of a fuel tank baffle.

Referring to the drawing, a fuel tank is generally designated by the reference character 10. The fuel tank 10 comprises an upper dished portion 11 and a lower dished portion 12. The dished portions 11 and 12 include, respectively, outwardly extending peripheral flanges 13 and 14. As best indicated in Figures 1, 2 and 4 the peripheral flange 13 includes a raised or spaced portion 15 which provides a recess 16 opening inwardly into the fuel tank 10, the said recess being substantially coextensive with the flanges 13 and 14.

A baffle assembly is generally designated at 17. The baffle assembly 17 comprises a relatively flat member 18 having a peripheral edge portion 19 which, as particularly indicated in Figures 1, 2 and 4, is supported or disposed within the recess 16. The flat member 18 comprises openings 20 and 21. The openings 20 and 21, as best shown in Figure 5, are formed during the formation of an upper baffle 22 and a lower baffle 23. In manufacture, the baffles 22 and 23 are formed by stamping the flat metal member in its blank condition whereupon the baffles 22 and 23 are cut from said member 18 and then bent into the position indicated. Thus the baffles 22 and 23 are integral, one extending in a first direction and the other extending in an opposite direction. The integral baffles 22 and 23 are separated by means of a strip 24 which is provided with an opening 25 through which a filler pipe 26 extends. The flat member 18 is also provided with suitable drain openings 27 as indicated.

Referring now particularly to Figure 6, another baffle is indicated at 28. The baffle 28 comprises an upper flange 29 and a lower flange 30. The baffle 28 also at its rear edge is provided with a cutout 31, a portion adjacent the cutout 31 being suitably bent to provide a lip 32 as particularly indicated in Figures 1 and 6.

The particular baffle assembly herein disclosed is efficiently suited for fuel tanks wherein it is desired to minimize the back-and-forth movement of the fuel during operation of a vehicle. The details of construction or forming of the baffle assembly need not be set forth in detail though it can be seen that in Figure 5 by simply slitting portions of the blank of the flat member 18 the baffles 22 and 23 may be suitably bent into position. After this has been effected the baffle 28 is connected to the flat member 18, as particularly indicated in Figure 1. The flanges 29 and 30 are now suitably spot welded to the baffles 22 and 23 and the lip 32 is also spot welded to the flat member 18 as indicated. Thus the baffle 28 extends vertically or substantially perpendicular with respect to the baffle 22 and the flat member 18. The terms "vertical," "upper" and "lower" are used in the sense of the normal position of the fuel tank which is as indicated in the figures. During assembly the baffle assembly 17 is placed in position indicated in Figure 1 wherein the peripheral edge portions 19 are supported within the recess 16. Thus the baffle assembly 17 extends across the tank 10 to divide the same into upper and lower compartments 33 and 34 respectively. The compartments 33 and 34 are, of course, suitably placed in communication by means of the openings 20 and 21. The flanges 13 and 14 may now be suitably seam welded together to thoroughly seal the tank whereby the baffle assembly 17 will firmly remain in position.

Thus it is apparent that a simplified baffle assembly and fuel tank have been provided. The parts may all be welded together with the baffle assembly simply and effectively constructed and then secured by welding. Thus in effect the assembler merely must handle four parts, namely the upper and lower dished portions, the baffle assembly and the filler pipe. Thus a simplified fuel tank has been provided, the baffle assembly being such as to effectively serve to keep the fuel from excessive shaking or moving during use of the vehicle to which the fuel tank may be attached.

Thus it is believed that the objects of the invention have been fully achieved and that an improved fuel tank and assembly has been provided. It must be understood that changes and modifications may be made without departing from the spirit of the invention as disclosed or the scope thereof as defined in the appended claims.

What is claimed is:

1. A fuel tank comprising upper and lower dished tank portions, each of said portions having an outwardly projecting peripheral flange, means connecting said peripheral flanges in complemental relation, said flanges having portions relatively spaced to provide a recess inside said tank extending coextensively with said flanges, a baffle assembly within said tank, said baffle assembly comprising a relatively flat member having peripheral edge portions carried in said recess, said flat member extending across said tank to divide the same into upper and lower compartments, said flat member having first and second laterally spaced openings providing communication between said lower and upper compartments, said flat member having a first integral baffle, said first baffle being positioned adjacent said first opening and extending vertically into said upper compartment, a second baffle member integral with said flat member, said second baffle member being positioned adjacent said second opening and extending vertically into said lower compartment, a third baffle disposed in said tank, said third baffle extending through said first opening, and being disposed substantially perpendicular to said flat member and said first baffle, a lower flange on said third baffle connected to said second baffle, an upper flange on said third baffle connected to said first baffle, and means connecting said third baffle to said flat member.

2. A fuel tank comprising first and second dished tank portions, each of said portions having an outwardly projecting peripheral flange, means connecting said peripheral flanges in complementary relation, said flanges having portions relatively spaced to provide a recess inside said tank extending coextensively with said flanges, a baffle assembly within said tank, said baffle assembly comprising a relatively flat member having peripheral edge portions disposed in said recess, said flat member extending across said tank to divide the same into first and second compartments, said flat member having first and second laterally spaced openings providing communication between said first and second compartments, said flat member having a first integral baffle, said first baffle being positioned adjacent said first opening and extending vertically into said first compartment, a second baffle member integral with said flat member, said second baffle member being positioned adjacent said second opening and extending vertically into said second compartment, a third baffle disposed in said tank, said third baffle extending through said first opening, and being disposed substantially perpendicular to said flat member and said first baffle, a first flange on said third baffle connected to said second baffle, a second flange on said third baffle connected to said first baffle, and means connecting said third baffle to said flat member.

3. A fuel tank comprising first and second dished tank portions, each of said portions having an outwardly projecting peripheral flange, means connecting said peripheral flanges in complemental relation, said flanges having portions relatively spaced to provide a recess opening inwardly into said tank and extending coextensively with said flanges, a baffle assembly within said tank, said baffle assembly comprising a relatively flat member having peripheral edge portions disposed in said recess, said flat member extending across said tank to divide the same into first and second compartments, said flat member having first and second laterally spaced openings providing communication between said first and second compartments, said flat member having a first integral baffle, said first baffle being positioned adjacent said first opening and extending vertically into said first compartment, a second baffle member integral with said flat member, said second baffle member being positioned adjacent said second opening and extending vertically into said second compartment, a third baffle disposed in said tank, said third baffle extending through said first opening, and being disposed substantially perpendicular to said flat member and said first baffle, a first flange on said third baffle connected to said second baffle, a second flange on said third baffle connected to said first baffle, and means connecting said third baffle to said flat member.

4. A fuel tank comprising first and second dished tank portions, each of said portions having an outwardly projecting peripheral flange, means connecting said peripheral flanges in complemental relation, said flanges having portions relatively spaced to provide a recess opening inwardly into said tank and extending coextensively with said flanges, a baffle assembly within said tank, said baffle assembly comprising a relatively flat member having peripheral edge portions disposed in said recess, said flat member extending across said tank to divide the same into first and second compartments, said flat member having an opening providing communication between said first and second compartments, said flat member having a first baffle extending into said first compartment, a second baffle member connected to said flat member, said second baffle member extending into said second compartment, a third baffle disposed in said tank, said third baffle extending through said opening and being disposed substantially perpendicular to said flat member and said first baffle, a first flange on said third baffle connected to said second baffle, a second flange on said third baffle connected to said first baffle, and means connecting said third baffle to said flat member.

5. A fuel tank comprising first and second dished tank portions, each of said portions having a peripheral flange, means connecting said peripheral flanges in complemental relation, said flanges having portions relatively spaced to provide a recess opening inwardly into said tank, a baffle assembly within said tank, said baffle assembly comprising a relatively flat member having portions disposed in said recess, the member extending across said tank to divide the same into first and second compartments, said member having an opening providing communication between said first and second compartments, a first baffle on said member extending into said first compartment, a second baffle member connected to said member, said second baffle member extending into said second compartment, a third baffle disposed in said tank, said third baffle extending through said opening and being disposed substantially perpendicular to said member and said first baffle, a flange on said third baffle connected to said second baffle, a flange on said third baffle connected to said first baffle, and means connecting said third baffle to said flat member.

6. A fuel tank comprising first and second dished tank portions, each of said portions having a peripheral flange, means connecting said peripheral flanges in complemental relation, said peripheral flanges having portions relatively spaced to provide a recess, a baffle assembly within said tank, said baffle assembly comprising a relatively flat member having portions carried in said recess, the member extending across said tank to divide the same into first and second compartments, said member having an opening providing communication between said first and second compartments, a first baffle on said member extending into said first compartment, a second baffle member connected to said member, said second baffle member extending into said second compartment, a third baffle disposed in said tank, said third baffle extending through said opening, and being disposed substantially perpendicular to said member and said first baffle, means connecting said third baffle to said first and second baffles, and means connecting said third baffle to said flat member.

References Cited in the file of this patent

UNITED STATES PATENTS

| | | |
|---|---|---|
| 2,332,001 | Nemetz | Oct. 19, 1943 |
| 2,703,607 | Simmonds | Mar. 8, 1955 |

FOREIGN PATENTS

| | | |
|---|---|---|
| 323,106 | Great Britain | Dec. 24, 1929 |
| 281,232 | Italy | Jan. 7, 1931 |